United States Patent Office 2,956,966
Patented Oct. 18, 1960

2,956,966

FLEXIBLE PHENOLIC-FORMALDEHYDE RESIN COMPOSITIONS

Robert Steckler, Chagrin Falls, Ohio, assignor to General Aniline & Film Corporation, New York, N.Y., a corporation of Delaware No Drawing. Filed Sept. 5, 1958, Ser. No. 759,123

10 Claims. (Cl. 260—19)

The present invention relates to a plasticized phenolic-formaldehyde resin composition having excellent flexibility and resistance to flaking or cracking.

It is known that phenolic compounds such as phenol per se, resorcinol, alkyl phenols, i.e. cresols, xylenes, phloroglucinol, etc. react with aldehydes (commonly formaldehyde) or ketones to form a variety of products. The nature of the resinous product depends on the choice of the phenolic compound and the aldehyde or ketone and on the conditions of the reaction. Phenolic-formaldehyde resins are of two main types. The resins resemble either the phenol alcohols or the dihydroxydiphenyl-alkanes in basic structure. If they are prepared with an excess of formaldehyde and an alkaline catalyst they will resemble the phenol alcohols and have methylol side or end groups. The molar ratio of formaldehyde to phenolic compound used may vary in a ratio from 1:1 to 3:1 e.g.:

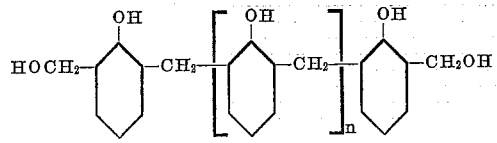

n=1 to 25.

Such resins are often referred to as resoles. They are capable of being cured by the application of heat and sometimes acids, cure resulting through condensation of the methylol groups. By cooling the resin the reactions may be conveniently stopped, or at least effectively retarded, anywhere between the addition of the formaldehyde and the final curing process. To resume the reaction, the temperature is raised or an acidic catalyst is added. Since there is no sharp break in these reactions such resins have been termed the One-Stage resins.

The majority of the One-Stage resins employ formaldehyde as the aldehyde, although certain other aldehydes may be used. Formaldehyde is preferred because of its high reactivity and freedom from side reactions.

On the other hand, if the phenolic resin is prepared with an acidic catalyst and less than a mole of formaldehyde per mole of phenolic compound, the resin will resemble a dihydroxydiphenylmethane in structure, e.g., the chains are phenol ended. The molar ratio of formaldehyde to phenolic compound used may vary anywhere from 1:2 to 1:1, e.g.:

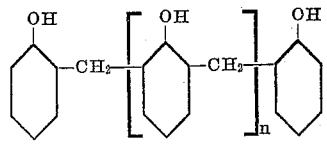

n=0 to 15.
O=dihydroxydiphenylmethane.

The resins, commonly referred to as Novolak, are permanently soluble and fusible and will cure upon the addition of formaldehyde (in the form of paraformaldehyde), or hexamethylenetetramine. As the preparation of the Novolak resin represents one process and the addition of the curing agent represents a separate and distinct process, resins based on a Novolak resin and a curing agent are referred to as Two-Stage resin.

Thermosetting phenolic-formaldehyde resins have certain inherent drawbacks which prevent their full commercial use as coating materials for the formation of films. In other words, such resins are brittle and have extremely poor resistance to flaking or cracking. These drawbacks are attributable to the lack of flexibility, elongation and adhesion of the cured film resulting from such phenolic-formaldehyde resins. Attempts to overcome these defects by incorporating any of the commercially available plasticizers yielded no improved results. Dioctyl phthalate, which is one of the most versatile plasticizers for various types of resins, proved ineffective in imparting flexibility and resistance to flaking or cracking of phenolic-formaldehyde resins.

It is an object of this invention to overcome the foregoing difficulties and to provide a plasticized phenolic-formaldehyde resin which possesses excellent flexibility, elongation, and resistance to flaking or cracking.

Other objects and advantages will become more clearly apparent from the following specification.

I have found that phenolic-formaldehyde resins of the phenol-alcohol type are successfully plasticized by employing a mixture of 30–100 parts by weight of a condensation product of polyoxy propylene or polyoxy propylene glycol with ethylene oxide or the condensation product of the sequential addition of propylene oxide and ethylene oxides with ethylene diamine (Tetronic Polyol) and 1–15 parts of an organic titanium chelate per 100 parts by weight, based on the non-volatile content, of a phenolic-formaldehyde resin. The latter is normally prepared in solution form, i.e. in volatile solvents such as alcohols, ketones, etc. Films cast from such a mixture display excellent flexibility and resistance to flaking or cracking. The polyoxypropylene glycol, the polyoxyethylene-polyoxypropylene-polyoxyethylene glycol, or tetronic polyol, and the organic titanium chelate is merely blended in the aforestated ratios with the phenolic-formaldehyde resin and the resulting solution employed in the preparation of coatings, films, etc., in the well known manner.

The phenolic-formaldehyde resins employed in accordance with the present invention are readily available on the open market and the procedure for their preparation is well known to those skilled in the art. As a consequence, references to literature or patents need not be made herein. However, for purposes of illustration, a procedure which yields a phenolic-formaldehyde resin soluble in lower alcohols such as methanol, ethanol, n-propanol or isopropanol, or ketones, glycol ethers, dioxane, and similar polar solvents is as follows:

To a 3-necked resin flask, equipped with a stirrer, thermometer and reflux condenser, were added 927 parts by weight of phenol, 927 parts by weight of formaldehyde (40% aqueous solution) and 10 parts by weight of concentrated ammonia. The mixture was refluxed with agitation until a drop of the reaction mixture cures into a resinous mass on a hot plate at a temperature of 200° C. in 1½ seconds. When this stage is reached, the resin is then dehydrated at 50° C. and 26″ vacuum for a period of 3½ hours during which the temperature is finally raised to 100° C. The resin is then dissolved in a lower alcohol such as methanol, ethanol, isopropanol to yield a 45–70% solution, preferably a 50% solution. In this case, ethanol was employed as the solvent to yield a 50% solution. The resulting phenolic-formaldehyde resin in solution is of the phenol-alcohol type.

The polyoxypropylene condensation product with ethylene oxide, more specifically called a polyoxyethylenepolyoxypropylene-polyoxyethylene glycol which is blended with the organic titanium chelate is characterized by the following general formula:

$$HO-(C_2H_4O)_x(C_3H_6O)_y(C_2H_4)_x-H$$

wherein $x$ represents a numeral ranging from 0 or 1 to 40 and $y$ represents a numeral ranging from 15 to 40. It is to be noted that when $x$ is zero the product is polypropylene glycol or polyoxypropylene compound. The polyethoxy-polypropoxy glycol is readily obtained by polymerizing propylene oxide to a molecular weight range of 800 to 2500. The resulting polyoxypropylene compound is water insoluble or hydrophobic. 50 to 90 parts of the polyoxypropylene are then reacted with 10 to 50 parts of ethylene oxide to yield a polyoxyethylene-polyoxy propylene-polyoxyethylene glycol having the foregoing general formula and a molecular weight ranging from 1000 to 11,000. The condensation of propylene oxide to yield polyoxypropylene of molecular weights of 800 to 25,00 and the further condensation thereof with ethylene oxide is accomplished by conventional means well known to those skilled in the art. These products are commercially referred to as being prepared by the sequential addition of propylene and ethylene oxides to propylene glycol. They are sold under the brand name of "Pluronics."

As illustrations of such polyoxyethylene-polyoxypropylene-polyoxyethylene glycols or "Pluronics," the following were prepared by conventional means:

A 90 parts by weight of polyoxypropylene compound having a molecular weight of 800–1000 were treated with 10 parts of ethylene oxide to yield a compound having the following structure in which the mole ratios are average:

$$HO(C_2H_4O)_1(C_3H_6O)_{15}(C_2H_4O)_1H$$

B 60 parts of polyoxypropylene compound of a molecular weight of 1000 to 1200 were condensed with 40 parts of ethylene oxide to yield a compound having the following structure in which the mole ratios are average:

$$HO(C_2H_4O)_9(C_3H_6O)_{20}(C_2H_4O)_9H$$

C 80 parts of polyoxpropylene compound having a molecular weight of 1500–1800 were condensed with 20 parts of ethylene oxide to yield a compound having the following structure in which the mole ratios are average:

$$HO(C_2H_4O)_4(C_3H_6O)_{28}(C_2H_4O)_5H$$

D 50 parts of polyoxypropylene compound having a molecular weight of 1800–2100 were condensed with 50 parts of ethylene oxide to yield a compound having the following structure in which the mole ratios are average:

$$HO(C_2H_4O)_{22}(C_3H_6O)_{30}(C_2H_4O)_{22}H$$

E 70 parts of polyoxypropylene compound having a molecular weight of 2100–2500 were condensed with 30 parts of ethylene oxide to yield a compound having the following structure in which the mole ratios are average:

$$HO(C_2H_4O)_{11}(C_3H_6O)_{40}(C_2H_4O)_{11}H$$

A′

Polypropylene glycol having an average molecular weight of approximately 800.

B′

Polypropylene glycol having an average molecular weight of approximately 1025.

C′

Polypropylene glycol having an average molecular weight of approximately 2025.

In lieu of the foregoing polyoxyethylene - polyoxypropylene-polyoxyethylene glycols, and polyoxypropylene glycols, compounds characterized by the following general formula may be used in combination with the organic titanium chelate in the aforementioned proportions:

$$H-(C_2H_4O)_m(C_3H_6O)_n\diagdown N-CH_2CH_2-N\diagup (C_3H_6O)_n(C_2H_4O)_m-H$$
$$H-(C_2H_4O)_m(C_3H_6O)_n\diagup \qquad \diagdown (C_3H_6O)_n(C_2H_4O)_m-H$$

wherein $n =$ a numeral ranging from 4 to 20 and $m =$ a numeral ranging from 1 to 30. These compounds are prepared by the sequential addition of propylene and ethylene oxides to ethylene diamine in accordance with conventional procedure which is well known to those skilled in the art. Briefly, they are prepared by reacting propylene oxide with 1 mole of ethylene diamine to give a base material having a molecular weight range of 292 to 4500. From 20–90 parts of the resulting base material are then reacted in the conventional way with 10–80 parts of ethylene oxide. They are all commercially available under the brand name of "Tetronic Polyols" having approximate molecular weights of 1700 to 12,000.

As specific illustrations of such Tetronic Polyols, the following were prepared and utilized in accordance with the present invention:

| | Base Material Molecular Weight [1] | Parts | Ethylene Oxide Parts |
|---|---|---|---|
| F | 2,500 | 80 | 20 |
| G | 3,000 | 90 | 10 |
| H | 2,700 | 70 | 30 |
| I | 3,000 | 80 | 20 |
| J | 2,500 | 50 | 50 |
| K | 3,000 | 60 | 40 |
| L | 2,500 | 20 | 80 |
| M | 3,000 | 30 | 70 |
| N | 1,000 | 50 | 50 |
| O | 1,000 | 60 | 40 |
| P | 500 | 50 | 50 |
| Q | 500 | 60 | 40 |
| R | 2,501–300 | 70 | 10–19 |
| S | 2,501–300 | 70 | 20–29 |
| T | 2,501–300 | 70 | 40–49 |

[1] Average molecular weight.

The organic titanium chelates that I employ are readily obtained in the usual manner by reacting 1 mole of a titanium ortho ester with 2, 2.2, 3 or 4 moles of either octylene glycol (2-ethylhexanediol-1,3) triethanolamine, triethanolamine-N-salts of fatty acids such as butyric, caproic, caprylic, capric, undecylic, myristic, palmitic, oleic, linoleic, stearic or any of the fatty acids whether saturated or unsaturated so long as they contain from 4 to 18 carbon atoms.

The titanium ortho esters utilized in the preparation of the corresponding chelates are characterized by the following general formula:

$$Ti(OR)_4$$

wherein R represents an alkyl group of one of the 3 to 18 carbon atoms, e.g. propyl, butyl, hexyl, octyl, nonyl, decyl, dodecyl, cetyl, octadecyl, etc. As illustrations of such titanium ortho esters, I have found the following to be especially adaptable for the preparation of the corresponding chelates:

Tetraisopropyl titanate
Tetra n-butyl titanate
Tetra n-amyl titanate
Tetrahexyl titanate
Tetra-2-ethylhexyl titanate
Tetraheptyl titanate
Tetraoctyl titanate
Tetranonyl titanate
Tetradecyl titanate
Tetrahendecyl titanate
Tetradodecyl titanate
Tetracetyl titanate
Tetrastearyl titanate The organic titanium chelates (all of which are commercially available under various brand or trade names) are, as pointed out above, readily obtained by reacting in the conventional manner 2, 2.2, 3 or 4 moles of the chelating compound such as octylene glycol, triethanolamine, a fatty acid salt of triethanolamine or a fatty acid of 3 to 18 carbon atoms with 1 mole of any one of the above titanium ortho esters. The triethanolamine titanate N-salts of fatty acids are readily obtained by reacting 2 moles of triethanolamine with 1 mole of the titanium ester of 1 or 2 moles of a fatty acid. All of the chelates utilized in accordance with the present invention are characterized by the following general formula:

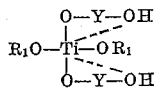

wherein $R_1$ represents either hydrogen or an alkyl radical from 3 to 18 carbon atoms and Y represents the chelating radical which is linked to two or more electron donating atoms such as oxygen or hydrogen and characterized by octylene glycol, triethanolamine or a fatty acid. Such titanium chelates can also be prepared by reacting glycols of 4 to 8 carbon atoms or amino alcohols such as triethanolamine in ratios of 2, 2.2, 3 or 4 moles per mole of titanium ortho-ester. The titanium chelates based on amino alcohols can be further reacted with partial or complete neutralization with fatty acids of 3 to 18 carbon atoms.

As examples of titanium chelates that may be used in conjunction with any one of the foregoing polyoxyethylene-polyoxypropylene-polyoxyethylene glycols, the following are illustrative:

| Organic Titanium Chelate | Molar Proportions | | | |
|---|---|---|---|---|
| | Chelating Compound | Ti | Acid | Employed as Solution |
| 1. Octylene glycol titanate (OGT-21) [1] | 2 moles Octylene glycol (2-ethyl-hexanediol-1,3). | 1 | | 40% in butanol. |
| 2. Octylene glycol titanate (OGT-2.21) | 2.2 moles octylene glycol (2-ethyl-hexanediol-1,3). | 1 | | 38% in butanol. |
| 3. Octylene glycol titanate (OGT-31) | 3 moles Octylene glycol (2-ethyl-hexanediol-1,3). | 1 | | 40% in butanol. |
| 4. Octylene glycol titanate (OGT-41) | 4 moles Octylene glycol (2-ethyl-hexanediol-1,3). | 1 | | Do. |
| 5. Triethanolamine titanate (TAT-21) | 2 moles Triethanolamine. | 1 | | 59% in isopropanol. |
| 6. Triethanolamine titanate-N-oleate (TAT-O-211). | ___do___ | 1 | 1 oleic | Do. |
| 7. Triethanolamine titanate-N-oleate (TAT-O-212). | ___do___ | 1 | 2 oleic | Do. |
| 8. Triethanolamine titanate-N-stearate (TAT-S-211). | ___do___ | 1 | 1 stearic | Do. |
| 9. Triethanolamine titanate-N-linseed acids salt (TAT-L-211). | ___do___ | 1 | 1 linseed fatty acids. | Do. |

[1] Trade name.

It is to be noted at the outset that the use of any one of the polyoxyethylene-polyoxypropylene-polyoxyethylene glycols, and polyoxypropylene glycols per se, including mixtures thereof, does not yield a plasticized phenolic-formaldehyde resin having resistance to flaking or cracking. Similarly, the use of the Tetronic Polyol per se, as well as the use of the organic titanium chelate alone does not yield a plasticized film which will exhibit resistance to flaking or cracking. It is only the combination of the organic titanium chelate either with the Tetronic Polyol or with the polyoxyethylene-polyoxypropylene-polyoxyethylene glycol or polyoxypropylene glycol in the aforementioned proportions which yields a completely plasticized film having unusual resistance to flaking or cracking as will be shown hereinafter.

The following examples will illustrate the various ways in which the phenolic-formaldehyde resin of the phenol-alcohol type may be plasticized to yield a composition which in film form possesses excellent flexibility and resistance to flaking or cracking. All parts given are by weight.

*Example I*

A film of the resin solution prepared as above described was cast on a 20 gauge automotive steel panel while employing a gauge with a 5 mil clearance. After ½ hour of air drying, the film was baked for a period of ½ hour at a temperature of 175° C. The cured film had a thickness of approximately 1 mil. The film was then evaluated for flexibility while employing a General Electric impact-flexibility tester and was found to give an impact elongation of 1%. This low figure is clearly indicative of a very brittle, poorly plasticized film.

The foregoing flexibility tester is commercially available on the open market and entails a solid metal cylinder which is dropped through a guide trap from a slide of approximately 4 feet. The impactor strikes the reverse side of the coated test panel which is supported by a rubber pad so that the circular imprint of the impactor is barely definable in the panel metal. Each end of the impactor is studded with a group of protruding spherical knobs arranged in a circle. After impact, the film is distended according to the curvature of the spherical surface forming a knob. The percentage elongation of the film is a function solely of the geometry of the knob itself, and is not dependent upon the rate of draw, thickness of the metal panel or other dimensions. This apparatus was chosen because it is ideal for testing resin films for their flexibility, either air dried or baked on a metal panel.

*Example II*

To 100 parts of the phenolic-formaldehyde resin as prepared above, were added 25 parts of a polyoxypropylene compound of illustration A. A film was cast on a 20 gauge automotive steel panel while using a gauge with a 5 mil clearance. The coated film was air dried for ½ hour followed by baking at 175° C. for ½ hour period. The cured film had a thickness of approximately 1 mil and when evaluated with the General Electric impact elongation tester gave an impact elongation of approximately 5%. This figure indicates a poorly plasticized film which is unsuitable wherein resistance to flaking or cracking is a prerequisite.

*Example III*

To 100 parts of the phenolic-formaldehyde resin prepared as above, were added 25 parts of Tetronic Polyol of illustration F. The mixture was stirred and a film cast in the same manner as in Example I. The dried and cured film gave an impact elongation of 1%, thus indicating a poorly plasticized and very brittle film.

*Example IV*

To 100 parts of the phenolic-formaldehyde resin prepared as above, were added 25 parts of polypropylene glycol having an average molecular weight of 1500

(illustration B'). The mixture was stirred and a film cast in the same manner as in Example I. The dried and cured film gave an impact elongation of 1%, thus indicating a poorly plasticized and very brittle film.

*Example V*

To 100 parts of the phenolic-formaldehyde resin prepared as above, were added 15 parts of octylene glycol titanate (commercially available under the brand name OGT-2.21). The mixture was stirred and a film cast in the same manner as in Example I. The dried and cured film gave an impact elongation of ½% thus indicating a poorly plasticized and very brittle film.

From the foregoing example, it is clearly evident that the use of either a polyoxypropylene glycol, polyoxyethylene-polyoxypropylene-polyoxyethylene glycol, Tetronic Polyol or an organic titanium chelate by itself as a plasticizer in phenolic-formaldehyde resins of the phenol-alcohol type yield a very poorly plasticized film having no resistance to flaking or cracking. The new

*Example VI*

A large quantity of phenolic-formaldehyde resin was prepared in accordance with the foregoing procedure. In addition, a sufficient quantity of a commercially available phenol-formaldehyde resin in alcohol, sold under the brand name of Resinox P-97 (50% of resin in alcohol) was obtained on the open market and utilized for test purposes. Both of the resin solutions were allocated into separate portions each containing 100 parts by weight of the resin based on the non-volatile basis to which was added (1) a mixture consisting of polyoxyethylene-polyoxypropylene-polyoxyethylene glycol and organic titanium chelate, (2) a mixture consisting of a Tetronic Polyol and organic titanium chelate, and (3) a mixture of polypropylene glycol and organic titanium chelate in various proportions. The resulting solutions were cast as in Example I and then evaluated in the General Electric impact elongation tester. The results obtained are tabulated in the following tables:

TABLE 1

| Organic Titanium Chelate | Parts | "Pluronic" | Parts | Parts of Phenol-Formaldehyde Resin Solution of Illustration Based on Non-volatile Content | Parts of Resinox P-97 Solution based on non-volatile Content | Percent G.E. Impact Elongation |
|---|---|---|---|---|---|---|
| No: | | | | | | |
| 1 | 1 | A | 30 | 100 | | 20 |
| 2 | 2.5 | B | 30 | | 100 | 40 |
| 3 | 5 | C | 30 | 100 | | 60 |
| 4 | 10 | D | 30 | | 100 | 60 |
| 5 | 15 | E | 35 | 100 | | 60 |
| 6 | 5 | A | 30 | | 100 | 60 |
| 7 | 10 | C | 35 | 100 | | 60 |
| 8 | 10 | D | 25 | | 100 | 60 |
| 9 | 15 | E | 30 | 100 | | 60 |
| | | B' | | | 100 | 60 |
| 2 38% in butanol | 5 | (Polypropylene Glycol).[1] | 35 | 100 | | 60 |
| Do | 5 | B' | 35 | | 100 | 60 |
| Do | 10 | C' | 30 | 100 | | 60 |
| 3 40% in butanol | 5 | C' | 30 | | 100 | 60 |

[1] General formula: $HOCH^2-(CH-O-CH_2)_n-CH-OH$
  $\qquad\qquad\qquad\quad\;\; |\qquad\qquad\quad\; |$
  $\qquad\qquad\qquad\quad\;\; CH_3\qquad\qquad\; CH_3$

TABLE 2

| Organic Titanium Chelate | Parts | "Tetronic Polyol" | Parts | Parts of Phenol-Formaldehyde Resin Solution of Illustration Based on Non- | Parts of Resinox P-97 Solution based on non-volatile Content | Percent G. E. Impact Elongation |
|---|---|---|---|---|---|---|
| No.: | | | | | | |
| 1 | 1 | F | 30 | 100 | | 20 |
| 2 | 2.5 | G | 30 | | 100 | 40 |
| 3 | 5 | H | 30 | 100 | | 60 |
| 4 | 10 | I | 30 | | 100 | 60 |
| 5 | 15 | J | 35 | 100 | | 60 |
| 6 | 5 | K | 30 | | 100 | 60 |
| 7 | 10 | L | 35 | 100 | | 60 |
| 8 | 10 | M | 35 | | 100 | 60 |
| 9 | 15 | N | 30 | 100 | | 60 | and unexpected feature in accordance with the present invention is that when either the aforementioned glycol or the aforementioned Tetronic Polyol is employed together with the organic titanium chelate in the aforementioned proportions, a new effect is obtained yielding complete plasticization and as a consequence a film which is highly resistant to flaking or cracking. The use of organic tin or zirconium chelates by themselves produces no beneficial effect whatsoever when employed alone as a plasticizer or together or in conjunction with the aforementioned glycol or Tetronic Polyol in the aforementioned concentrations.

From the foregoing tables it becomes clearly manifest that a mixture of at least 30 parts by weight of either the aforementioned glycols or Tetronic Polyols and 1-15 parts by weight of the organic titanium chelate per 100 parts of the phenolic-formaldehyde resin containing 100% solids, yields exceptionally good plasticized films possessing resistance to cracking or flaking. The high percent of impact elongation is always indicative of a very well plasticized film.

In order to determine what effect varying amounts of the organic titanium chelate would have on a finished film, separate solutions in ethanol were prepared in accordance with the foregoing procedure and the following results obtained:

| Components | All parts by weight based on non-volatile basis Solution | | | | | | | | |
|---|---|---|---|---|---|---|---|---|---|
| | 1 | 2 | 3 | 4 | 5 | 6 | 7 | 8 | 9 |
| Resinox P-97 | 67 | 67 | 67 | 67 | 67 | 67 | 67 | 67 | 67 |
| "Pluronic" A | 33 | 33 | 33 | 33 | 33 | 33 | 48 | 43 | 40 |
| Octylene glycol titanate (OGT-2.21) | 0 | 1 | 2.5 | 5 | 10 | 15 | 0 | 5 | 0 |
| G.E. Impact, Elongation, percent | 5 | 20 | 40 | over 60 | over 60 | over 60 | 10 | over 60 | 10 |

When "Pluronic" A was replaced by an equivalent amount of "Tetronic Polyols" R, S and T, identical results were obtained as follows:

| G.E. Impact, Elongation: | | | | | | | | | |
|---|---|---|---|---|---|---|---|---|---|
| R percent | 5 | 20 | 40 | over 60 | over 60 | over 60 | 10 | over 60 | 10 |
| S do | 5 | 20 | 40 | 60 | 60 | 60 | 10 | 60 | 10 |
| T do | 5 | 20 | 40 | 60 | 60 | 60 | 10 | 60 | 10 |

Instead of employing straight alcohol solutions of the phenolic-formaldehyde resins, it is possible to incorporate various fillers and pigments together with other organic solvents compatible with alcohol to yield varnishes and lacquers which upon baking will yield coatings having extreme flexibility and resistance to cracking or flaking.

I claim:

1. A heat curable coating composition comprising 100 parts by weight of a phenol-formaldehyde resin, 30–100 parts by weight of a compound characterized by a formula selected from the class consisting of the following formulae:

$$HO-(C_2H_4O)_x(C_3H_6O)_y(C_2H_4O)_x-H$$

and

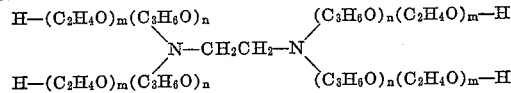

wherein $m$ represents a numeral ranging from 1 to 30, $n$ represents a numeral ranging from 4 to 20, $x$ represents a numeral ranging from 0 to 40, $y$ represents a numeral ranging from 15 to 20, and 1 to 15 parts by weight of an organic titanium chelate having the following general formula

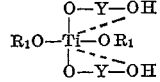

wherein $R_1$ represents a member selected from the class consisting of hydrogen and an alkyl group of from 3 to 18 carbon atoms, and Y represents a chelating radical selected from the class consisting of

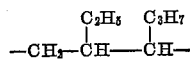

and

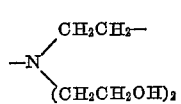

2. A heat curable coating composition according to claim 1 wherein the chelating radical is

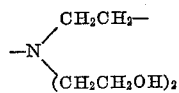

3. A heat curable coating composition according to claim 2 wherein the triethanolamine chelate radical is neutralized with a fatty acid of from 3 to 18 carbon atoms.

4. A heat curable coating composition according to claim 3 wherein the fatty acid is oleic acid.

5. A heat curable coating composition according to claim 3 wherein the fatty acid is stearic acid.

6. A process of obtaining a heat cured film having flexibility and resistance to flaking and cracking comprising coating a surface with a composition comprising 100 parts by weight of a phenol-formaldehyde resin, 30–100 parts by weight of a compound characterized by a formula selected from the class consisting of the following formulae:

$$HO-(C_2H_4O)_x(C_3H_6O)_y(C_2H_4O)_x-H$$

and

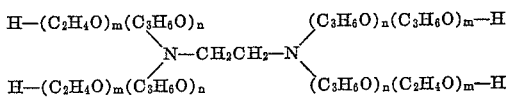

wherein $m$ represents a numeral ranging from 1 to 20, $n$ represents a numeral ranging from 4 to 20, $x$ represents a numeral ranging 0 to 40, and $y$ represents a numeral ranging from 15 to 40 and 1 to 15 parts by weight of an organic titanium chelate having the following general formula:

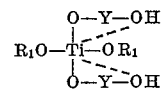

wherein $R_1$ represents a member selected from the class sisting of hydrogen and an alkyl group of from 3 to 18 carbon atoms, and Y represents a chelating radical selected from the class consisting of

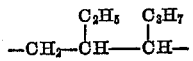

and

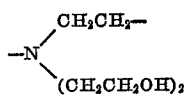

7. The process according to claim 6 wherein the chelating radical is

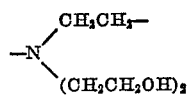

8. The process according to claim 7 wherein the triethanolamine chelate radical is neutralized with a fatty acid of from 3 to 18 carbon atoms.

9. The process according to claim 8 wherein the fatty acid is oleic acid.

10. The process according to claim 8 wherein the fatty acid is stearic acid.

No references cited.

UNITED STATES PATENT OFFICE
CERTIFICATE OF CORRECTION

Patent No. 2,956,966                          October 18, 1960

Robert Steckler

It is hereby certified that error appears in the above numbered patent requiring correction and that the said Letters Patent should read as corrected below.

Column 3, line 20, for "25,00" read -- 25,000 --; column 9, line 48, for "20" read -- 40 --.

Signed and sealed this 14th day of November 1961.

(SEAL)
Attest:

ERNEST W. SWIDER                          DAVID L. LADD
Attesting Officer                              Commissioner of Patents

USCOMM-DC